Jan. 19, 1943.   R. J. RICKENBACHER   2,308,627
GRIP
Filed Aug. 26, 1940

Inventor
ROBERT J. RICKENBACHER,
BY
Toulmin & Toulmin
Attorneys

Patented Jan. 19, 1943

2,308,627

UNITED STATES PATENT OFFICE 2,308,627

GRIP

Robert J. Rickenbacher, Columbus, Ohio, assignor to The Kilgore Manufacturing Company, Westerville, Ohio, a corporation of Ohio Application August 26, 1940, Serial No. 354,227

2 Claims. (Cl. 145—61)

This invention relates to grips, handles and the like, which are composed of a plurality of parts rigidly connected with one another.

Heretofore, such handles or grips, for instance pistol grips, were made by riveting or screwing the individual grip portions together so that the rivet or screw passed entirely through the parts to be connected and was visible from the outside.

This known method of assembling the individual parts of a handle or grip has the drawback that the screws or rivets are often tightened too much so that they exert an undue pressure on the individual members making up the handle or grip, which results in a gradual warping of the handle or grip portion over a period of time. When using plastic handle grip portions it even occurs that the grip portions break.

A further drawback of the known method referred to above consists in that the assembling operation takes relatively much time. When fastening the handle or grip portions by means of a screw and nut, it also happens sometimes that the nut turns loose and may even be lost.

Accordingly, it is an object of the invention to provide a new method of assembling the individual portions of a grip handle, which requires less time than the methods heretofore known, while preventing undue tightening pressure on the individual grip or handle portions.

It is another object of the invention to provide a method as set forth in the preceding paragraph, which will make it possible to increase the number of parts making up the grip or handle without having to increase the connecting members for connecting the said parts.

It is also an object of the invention to provide a multipart grip or handle, in which the means connecting the individual grip or handle portions with one another are invisable from the outside.

A further object of the invention consists in providing a multipart handle or grip, in which the individual grip or handle portions are connected with one another by means anchored in recesses on the inside of said portions.

It is another object of the invention to provide a new multipart handle or grip as set forth above, in which at least some of the handle or grip portions consists of plastic material.

A still further object of the invention consists in the provision of a multipart handle or grip in which some of the outer grip or handle portions are connected with one another by further but smaller outer handle portions superimposed upon said first mentioned handle portions.

These and other objects and advantages of the invention will appear more clearly from the following specification in connection with the accompany drawing, in which.

General arrangement

Figure 1:
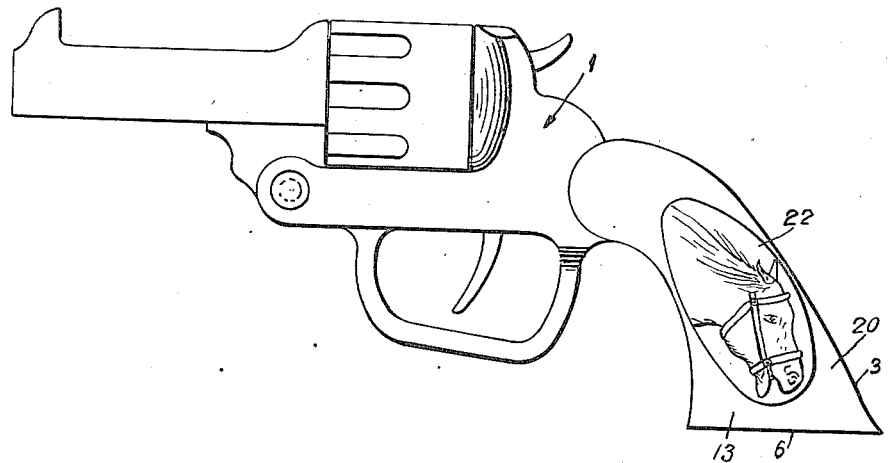
Figure 1 shows the invention in connection with the butt end of a pistol.
Figure 2:
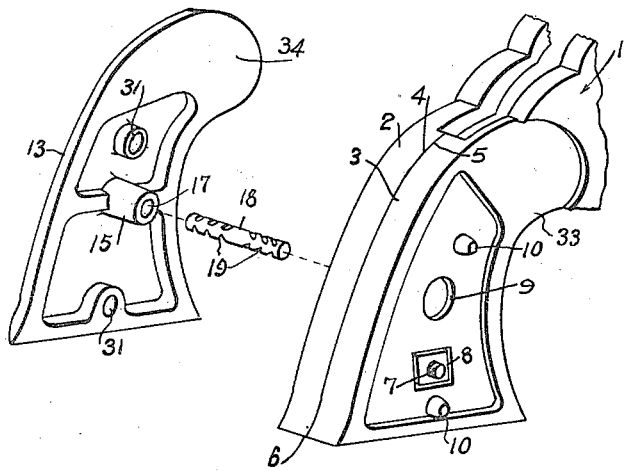
Figure 2 shows an exploded view of Figure 1 in which one of the outer grip members has been omitted.

In general, the handle or grip, according to the invention, consists of an intermediate member and at least two outer members arranged on opposite sides of said intermediate member and engaging the same, while a pin provided with barbs, grooves, sharp edges or the like, passes through the intermediate member and is anchored in oppositely located outer members so as rigidly to connect said members with one another. The assembling of the grip, according to the invention, is effected by placing and anchoring one end of the pin, provided with barbs, notches, or the like, in one of the outer grip portions so that it does not pass through the latter, then placing the outer grip member connected with said pin on one side of the intermediate member and pressing the opposite outer grip member having a pin receiving portion on its inside, against the other side of the intermediate member so that the pin becomes anchored in the pin receiving portion of the last mentioned outer member.

Structural arrangement

In the drawing, 1 designates a pistol comprising two halves 2 and 3 which engage each other with their flanges 4 and 5 defining the butt 6 of the pistol 1. The butt halves 2 and 3, which preferably consist of cast iron or other metal, are pressed against and connected with each other by means of a screw 7 passing through the halves 2 and 3 and a nut 8 threaded upon the screw 7. The butt halves 2 and 3 comprise bores 9, 9a, which are in alignment with each other, and dowels 10 and 11 adapted to engage recesses 30 and 31 in the grip portions 12 and 13 so as to locate the latter with respect to the butt halves 3 and 2. The grip portions 12 and 13, which may be made of wood, plastic material, or any other convenient material, are each provided with a lug 14 and 15 respectively. The lugs 14 and 15 comprise a bore 16 and 17 respectively and have an outer diameter which is less than the inner diameter of the bores 9, 9a. The grip portions 12 and 13 are connected with each other by a metallic pin 18 provided with warps or notches 19 and pressed into the bores 16 and 17 of the lugs 14 and 15 respectively. The diameter of the pin 18 and the warps 19 are such that when the pin 18 is pressed into respective lugs of the grip portions 12 and 13 they will be rigidly anchored in the lugs so that a permanent and rigid connection is established between the grip members 12 and 13.

Figure 4:
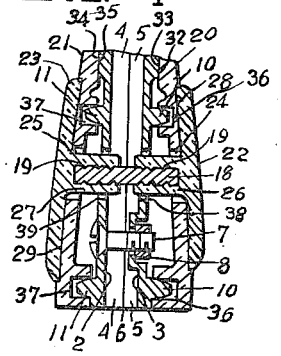
Figure 4 is a section through a further embodiment of the invention.
Figure 3:
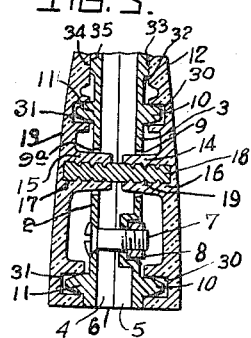
Figure 3 is a section through the butt end of the pistol shown in Figures 1 and 2.

While, according to Figure 3, only two grip members 12 and 13 cover the butt 6 of the pistol 1, according to Figure 4 four grip portions 20, 21, 22 and 23 are provided. As will be seen from Figure 4, the grip portions 20 and 21 are provided with a bore 24 and 25 respectively through which lug portions 26 and 27 of the additional grip members 22 and 23 extend. In this embodiment the pin 18 is anchored in the lugs 26 and 27 of the additional grip portions 22 and 23 in the same manner as the pin 18 is anchored in the lugs 14 and 15 of the grip portions 12 and 13 of the embodiment shown in Figure 3. In the embodiment of Figure 4 the dowels 10 and 11 locate the grip portions 20 and 21, while the additional grip portions 22 and 23 press the grip portions 20 and 21 against the butt 6 and hold them fast thereon.

As will be appreciated, the additional grip portions 22 and 23 may be of a material different from the material of which the grip portions 20 and 21 are made so that an ornamental effect can be obtained by using different material and or color for the grip portions 20 and 21 on one hand and the grip portions 22 and 23 on the other hand. If desired, the grip portions 22 and 23 may constitute an ornament, initial or picture as shown, for instance, in Figure 1 but, if preferred, the said ornament, initial or picture may also be impressed or otherwise arranged on the grip portions 12 and 13.

In case the grip portions are made of plastic material they are preferably provided with ribs on the inside thereof so as to stiffen the outer grip members.

The assembly of the grip portions is extremely simple. Referring to the embodiment of Figure 3, the butt halves 2 and 3 are first firmly pressed against and rigidly connected with each other by means of screw 7 and nut 8. Thereupon one end of the connecting pin 18 is pressed into the lug of one grip portion, for instance grip portion 12, whereupon the grip portion 12, together with the pin 18, is placed upon the butt half 3 so that the flange portion 32 of the grip portion 12 engages the adjacent flange portion 33 of the butt half 3, while the dowels 10 engage the recesses 30 of the grip portion 12, thereby locating the latter on the butt half 3. When the grip portion 12 is so located its lug 14, together with the pin 18, passes through the bore 9 of the butt half 3, while the free end of the pin 18 extends through the bore 9a of the butt half 2. Now the grip portion 13 is arranged so that its bore 17 engages the free end of the pin 18 and the recesses 31 are in alignment with the dowels 11, whereupon pressure is exerted upon the grip portion 13 so that its flange portion 34 is firmly pressed against the flange portion 35 of the butt half 2. The pin 18 will then automatically become anchored in the lug 15 of the butt half 2, thereby establishing a rigid connection between the grip portions 12 and 13.

The assembling of the grip portions in the embodiment of Figure 4 is similar to that of Figure 3. After the butt halves 2 and 3 have been connected with each other as mentioned above, the grip portions 20 and 21 are pressed on the butt 6 so that the dowels 10 and 11 engage the recesses 36 and 37 in the grip portions 20 and 21 respectively. Thereupon the pin 18 is pressed into one of the auxiliary grip members, for instance grip member 22, in which instance the grip member 22 is pressed on the grip member 20 so that its lug 26 passes through the bore 38 in the butt half 3. The bore 38 in the butt half 3 of embodiment 4 corresponds to the bore 9 in the butt half 3 of embodiment 3, and is slightly larger in diameter than the outer diameter of the lugs 26, 27. The proper location of the additional grip members 22, 23 on the grip portions 20, 21 is preferably effected by depressions 28, 29 provided in the grip portions 20, 21 which in their contour correspond to the contour of the additional grip members 22, 23. Of course, any other locating means on the grip portions 20, 21 and 22, 23 may be used. For instance, if the main grip portions 20, 21 have no depression or recess corresponding to the configuration of the additional grip members, the diameter of the bore 38 might be chosen so that the lugs 26 snugly fit therein, while a turning movement of the additional grip members 22, 23 is prevented by a lug or similar protruding portion at least on one of the members 22, 23 which would then engage a corresponding recess in the main grip portion pertaining thereto.

Now the auxiliary grip member 29 is placed on the grip portion 21 so that its bore in the lug portion 27 engages the free end of the pin 18. Thereupon pressure is exerted upon the auxiliary grip member 29 so that its lug portion 27 passes through the bore 39 in the butt half 2 and the pin 18 becomes firmly anchored in the lug portion 27 of the member 29. In this way a rigid connection between the auxiliary grip members 22 and 23 is established which hold the grip portions 20 and 21 firmly pressed against the adjacent butt portions 3 and 2.

It will be understood that I desire to comprehend within my invention such modifications as come within the scope of the claims and the invention. Thus this invention is by no means limited to handles or grip portions but applies to any articles in which two outer members are arranged on opposite sides of an intermediate member and connected with each other therethrough.

Having thus fully described my invention, what I claim as new and desire to secure by Letters Patent, is:

1. A handle or grip comprising an intermediate member provided on the outside thereof with first locating means, and with an aperture intermediate said locating means, two outer grip members arranged on opposite sides of said intermediate member and having on the inside thereof second locating means corresponding in position to said first locating means and being arranged for engagement therewith, said first and second locating means including pairs of dowels on one of said members, and pairs of recesses in the member engaged thereby, each of said grip members being provided on the inside thereof with an inwardly projecting lug entering said aperture and having a bore which is less in length than the combined thickness of said lug and grip member, and a barbed or notched pin anchored in the bores of said lugs so as to cause said grip members to be firmly held against said intermediate member.

2. A handle or grip comprising an intermediate member provided on the outside thereof with first locating means, and with an aperture intermediate said locating means, a plurality of grip members arranged on opposite sides of said intermediate member and having on the inside thereof second locating means corresponding in position to said first locating means and being arranged for engagement therewith, said first and second locating means including pairs of dowels on one of said members, and pairs of recesses in the member engaged thereby, means comprising a pair of inwardly projecting lugs, each of which has a connection with a grip member and extends into said aperture, each of said lugs having a bore terminating within the length of the lug, and a barbed or notched pin anchored in the bores of the lugs so as to cause said grip members to be held firmly against said intermediate member.

ROBERT J. RICKENBACHER.